United States Patent [19]

Bock

[11] Patent Number: 4,992,014

[45] Date of Patent: Feb. 12, 1991

[54] TRANSPORT SAFETY FOR CONTAINERS, NOTABLY INTERCHANGEABLE CONTAINERS

[75] Inventor: Normann Bock, Syke-Barrien, Fed. Rep. of Germany

[73] Assignee: Ldelhoff M.S.T.S. GmbH, Iserlohn, Fed. Rep. of Germany

[21] Appl. No.: 348,585

[22] PCT Filed: Jul. 1, 1988

[86] PCT No.: PCT/DE88/00407

§ 371 Date: Mar. 9, 1989

§ 102(e) Date: Mar. 9, 1989

[30] Foreign Application Priority Data

Jul. 10, 1987 [DE] Fed. Rep. of Germany ... 8709539[U]

[51] Int. Cl.[5] .......................... B60P 7/10; B65D 88/12

[52] U.S. Cl. .......................................... 410/52; 410/68; 410/80

[58] Field of Search ................... 410/68, 121, 156, 80, 410/77, 84, 90, 94, 95, 52, 71, 69, 78, 44, 76

[56] References Cited

U.S. PATENT DOCUMENTS

| | | | |
|---|---|---|---|
| 2,251,839 | 8/1941 | Dondlinger | 254/45 |
| 2,273,854 | 2/1942 | Fitch | 410/94 |
| 3,059,886 | 10/1962 | Lord | 410/69 |
| 3,144,838 | 8/1964 | Shaver | 410/76 |
| 3,358,616 | 12/1967 | Brodhead | 410/44 |
| 3,439,822 | 4/1969 | Korodi | 410/52 |
| 3,449,801 | 6/1969 | Lafont et al. | 410/77 |
| 4,234,278 | 11/1980 | Harshman et al. | 410/77 |
| 4,349,302 | 9/1982 | Ferguson | 410/69 |
| 4,805,859 | 2/1989 | Hudson | 410/77 |

FOREIGN PATENT DOCUMENTS

| | | | |
|---|---|---|---|
| 1101282 | 3/1961 | Fed. Rep. of Germany | 410/77 |
| 1456673 | 3/1969 | Fed. Rep. of Germany . | |
| 1083385 | 1/1955 | France | 410/94 |
| 6804313 | 9/1969 | Netherlands | 410/52 |
| 0364946 | 1/1932 | United Kingdom | 410/77 |

*Primary Examiner*—Robert P. Olszewski
*Assistant Examiner*—Mark T. Le
*Attorney, Agent, or Firm*—Collard, Roe & Galgano

[57] ABSTRACT

A locking device for the transport of containers, in particular, lift-on lift-off containers which, by means of a lifting device, for example, a lift-on lift-off mechanism, can beloaded onto the back of a transport vehicle comprises adjusting elements arranged on the underside of the contain at the level of the container's loading surface, as well as arresting elements arranged on the loading surface. For each arresting element, an adjusting element associated with it is maintained in the in-transit position of the container. Adjusting elements and arresting elements are configured as reciprocally intermeshable form-fitting elements.

10 Claims, 4 Drawing Sheets

11 11 20 21 27 4 20 21 27 24

14
5
6
7
8
26
13
9
11
3
1
2
10
4

9
15
10
13
17
19
11
4
18
12
16

9
11
4

27
20
4
11
21

11
9
4

22
23

TRANSPORT SAFETY FOR CONTAINERS, NOTABLY INTERCHANGEABLE CONTAINERS

BACKGROUND OF THE INVENTION

1. Field of the Invention

The invention relates to a locking device for the transport of containers, in particular, lift-on lift-off containers which, by means of a lifting device, for example, a lift-on lift-off mechanism, can be loaded onto the back of a transport vehicle.

2. The Prior Art

Appropriate bolting down devices for securing lift-on lift-off containers from sliding and tipping during transport on vehicles are known in the art. The bolting down devices encompass, for example, horizontal pins arrayed on the underside of the container which slide into eyes arranged on the vehicle as soon as the container has assumed its intended final position, the in-transit position, on the vehicle. Actuable bolting down elements are also known in the art which consists of pivotable, hook-like flaps aligned in a longitudinal direction of the vehicle about horizontal axes which can overlap the flanges of reinforcement sections, ground guides or similar projections located on the underside of the container thereby securing the container against its lifting up from the loading surface.

Combinations of the device described hereinbefore are also possible in providing a locking device for the transport of a lift-on lift-off container.

Existing systems for securing lift-on lift-off containers during transit have the disadvantage that they are specially adapted for use in connection a lift-on lift-off mechanism already known in the art. In practical operation it may of course turn out that lift-on lift-off containers are not loaded onto or off of transport vehicles by means of a lift-on lift-off mechanism but, rather, by means of another lifting device, for example, an ordinary crane. One could imagine this is the case with railroad cars, truck trailers, watercraft and the like in which instances so-called loading cranes are especially used with which vehicles are frequently equipped in order to facilitate the on- and off-loading of parcel freight.

The locking devices for the transport of containers known in the art actually prevent movement of the containers in a direction perpendicular to the loading surface on which the containers are intended to be positioned or loaded, with the result that a lift-on lift-off container which has been on-loaded with a lift-on lift-off mechanism, for example, cannot be off-loaded by means of another lifting device, a crane.

SUMMARY OF THE INVENTION

The task of the invention is to devise a locking device for the transport of containers in such a way that it can perform its function both during transloading of the containers using the lift-on lift-off mechanisms known in the art as well as with other lifting devices like, for example, an ordinary crane.

This task is resolved by the invention in that adjusting elements are arranged on the underside of the container in the level of its loading surface, in that arresting elements are arranged on the loading surface, and in that on each arresting element an adjusting element associated with it is maintained in the in-transit position of the container.

The adjusting elements determine the position to be assumed by the container on the loading surface of a vehicle. Adjusting elements and arresting elements may, therefore, be structurally configured as simple stops which come to lie one on top of the other as soon as the container has assumed its final in-transit position on the loading surface. It does not matter whether the container has reached this position through the action of a lift-on lift-off mechanism or through the action of another lifting device, for example, an ordinary crane. The appropriate configuration of the adjusting element and the arresting element ensures that each adjusting element on the arresting element is maintained in the intended in-transit position of the container, whereby the desired securing of the container during transit has been assured.

This can, for example, be achieved by configuring the adjusting element and arresting element as reciprocally intermeshable form-fitting elements. These form-fitting elements are aligned in such a way that an adjusting element on the container can be inserted or removed from above unobstructed into its respective arresting element on the loading surface of the vehicle as soon as the container has been lowered onto or lifted from the loading surface. Again, it is of no consequence whether said lowering or lifting has been effected by a crane or a lift-on lift-off mechanism. Because the adjusting element and arresting element concurrently function as the stops which determine the in-transit position of the container, a container loaded onto the loading surface of a vehicle is protected against braking and acceleration forces which are operable in the longitudinal direction of the vehicle during transit. Because of their configuration as form-fitting elements, protection against forces acting transversely along the longitudinal axis of the vehicle or on the longitudinal axis of the container is simultaneously provided. This is made possible by the fact that each arresting element exhibits at least one undercut and that the adjusting element has at least one projection which engages the undercut, whereby the form-fitting connection is assured the moment the container is on the loading surface. In this configuration, the form-fitting connection can be swallow-tail shaped or also wedge-shaped.

Each arresting element consists preferably of adjoining cams where each adjusting element is a projecting part which can be disposed between the cams. The adjusting element consequently meshes in between two respective cams of an arresting element as soon as the container is on the loading surface, with the resultant advantage that protection of the container against longitudinal and transverse forces during transit has been provided.

To ensure that the sliding movement of the container on the loading surface required for on- and off-loading with a lift-on lift-off mechanism is not obstructed by the side-by-side cams of the arresting element, provision has been made, in a further development, that a first cam of the arresting element, respectively facing the front end of vehicle loading surface, is flatter than respective adjoining second cam of the same arresting element working in conjunction with it. This makes it possible to move a container on the loading surface by means of a lift-on lift-off mechanism. The adjusting element can be made to slide unobstructed over the flat first cam during sliding movements of the container because the lift-on lift-off mechanism is usually able to move the container in a slightly elevated position as well. As soon as the adjusting element strikes the second, higher cam of the same arresting element, the final position of the container on the loading surface has been reached and the container can be lowered, with the result that the adjusting element is now lies secured between both cams.

Each adjusting element is preferably a flap laterally mounted on a projecting ground guide in parallel alignment with the bottom of the container. The unengaged end of this flap can be swallow-tail-shaped or wedge-shaped in order to effect the aforementioned form-fitting connection with the correspondingly configured cams.

Each cam is preferably a block mounted to the loading surface. Such blocks can also be arrayed directly on the tilting platform of a lift-on lift-off mechanism with which, for example, a vehicle has been equipped.

Preferably, four adjusting elements and arresting elements each have been provided for every container positioned on a loading surface.

It is, however, also possible to provide each container with two securing adjusting elements and arresting elements in the area of one of its front ends, whereby the other front end, respectively, can be secured by an actuable bolting down device already known in the art. Of course, the bolting down device will have to be released as soon as the container is lifted off the loading surface or is again set down thereon. This can be accomplished, for example, through hydraulic, pneumatic and even mechanical actuation. Each bolting down device can, for example, comprise a clamping jaw which can be inserted into a corresponding receptacle on the container, where the clamping jaw can move, swiveling about corresponding axes and the movement is either hydraulically, pneumatically, or mechanically generated.

BRIEF DESCRIPTION OF THE DRAWINGS

Exemplified embodiments of the invention, from which additional inventive characteristics will be apparent, are shown in the drawings. Shown are, in.

DETAILED DESCRIPTION OF PREFERRED EMBODIMENTS

Figure 1:
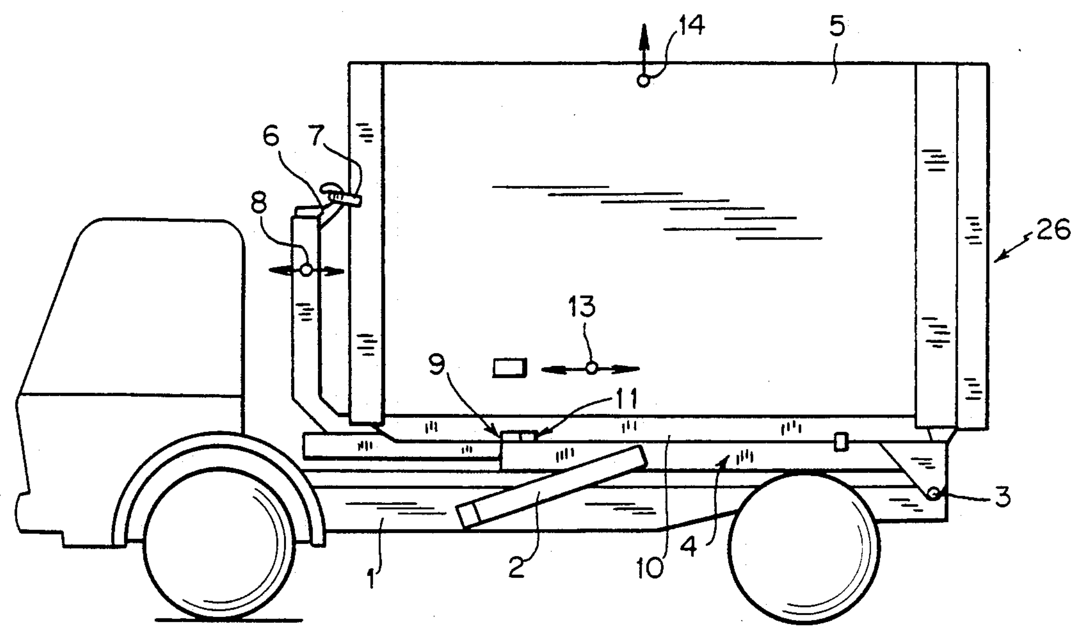
FIG. 1 the schematic lateral view of a vehicle with a lift-on lift-off container loaded thereon.

FIG. 1 shows a truck in a lateral view whose chassis 1 is outfitted with a lift-on lift-off mechanism whose titling platform, which pivots by means of a working cylinder 2 about a rear point of rotation 3, functions as a loading surface 4 onto which a lift-on lift-off container 5 known in the art has been loaded. The lift-on lift-off mechanism is a so-called hook device which, with its hook 6, can engage a metal fitting 7 on the container. The hook 6 can move in the direction of the arrow 8 relative to the tilting platform of the lift-on lift-off container in the longitudinal direction of the vehicle chassis 1. There is an arresting element 9 on the tilting platform of the lift-on lift-off container functioning as a loading surface 4. The lift-on lift-off container 5 has reinforcing ground guides 10 on its underside. By means of its ground guides the lift-on lift-off container slides on the tilting platform of the lift-on lift-off container functioning as a loading surface 4.

Adjusting elements 11 are located on the underside of the lift-on lift-off container, preferably on its ground guides 10.

A bolting down device 12 already known in the art is arranged in the rear section on the tilting platform functioning as a loading surface 4, which bolting down device can be configured as a shiftable clamp which grips in behind a flange of the ground guide 10.

During on-loading of the lift-on lift-off container 5, the lift-on lift-off container is moved by means of the hook 6 to the left on the tilting platform functioning as a loading surface 4 until the adjusting element 11, which is arranged on the lift-on lift-off container, strikes against the arresting element 9 which is mounted to the tilting platform or the loading surface 4. The lift-on lift-off container has thus assumed it in-transit position. At the same time, it is secured by the reciprocal striking of arresting element and adjusting element against slippage in the direction of the double arrow 13. To provide additional protection, the bolting down device 12 already known in the art is moved into the locked position.

The container can, after the bolting down device has been released, also be set down by means of the lift-on lift-off mechanism shown here. Nevertheless, because of the special type of construction of the locking device for the transport of containers, it is also possible to lift up perpendicularly in the direction of the arrow 14 or set down the container, shown here in its in-transit position, from the vehicle by means of another lifting device, for example, an ordinary crane.

Figure 2:
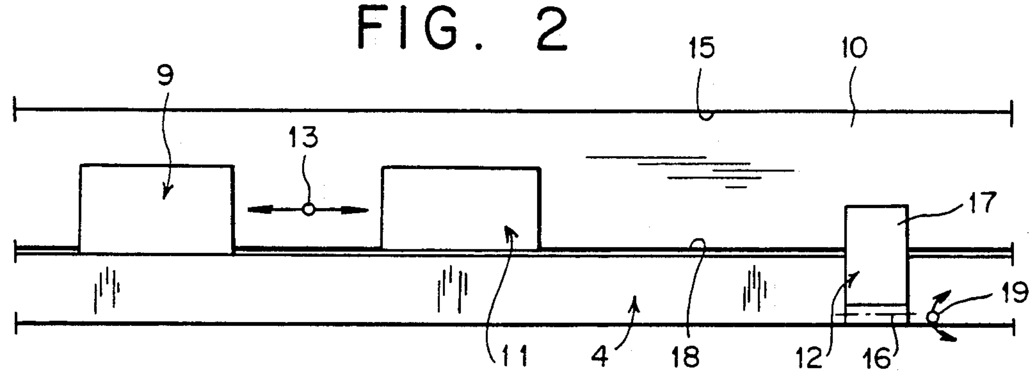
FIG. 2 a first exemplified embodiment of a locking device for the transport of containers.

FIG. 2 shows a partial lateral view of a ground guide 10 of a lift-on lift-off container otherwise not depicted in the drawing. Reference No. 4 designates a loading surface which can also be formed by a section. An arresting element 9 has been arranged on this section which forms the loading surface 4 in such a way that the element projects against the underside of the container not shown here and where the underside is indicated by the upper flange 15 of the ground guide 10, which flange in the drawing is shown by a simple line.

The adjusting element 11 is arranged on ground guide 10 and projects out from the drawing plane such that when the ground guide 10 or the entire lift-on lift-off container move in the direction of the double arrow 13, the adjusting element 11 and arresting element 9 are made to slide toward each other or to move away from each other.

Reference No. 12 schematically reproduces a bolting down device which is here configured as a clamping jaw attached pivotally about a hinged axis 16 on the loading surface, which clamping jaw can engage or release a lower flange 18 of the ground guide 10 whenever a pivoting movement in the direction of the circular arrow 19 occurs with the assistance of appropriate actuating elements otherwise not shown here.

Figure 3:
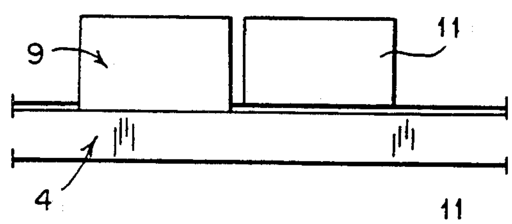
FIG. 3 a part of the locking device for the transport of containers according to FIG. 2, in the in-transit position.

FIG. 3 shows a view according to FIG. 2, wherein the arresting element 9 and adjusting element 11, by moving the container relative to the loading surface 4 to the left, have moved so far that a stop has almost been reached, that is, the container has nearly assumed its in-transit position.

Figure 4:
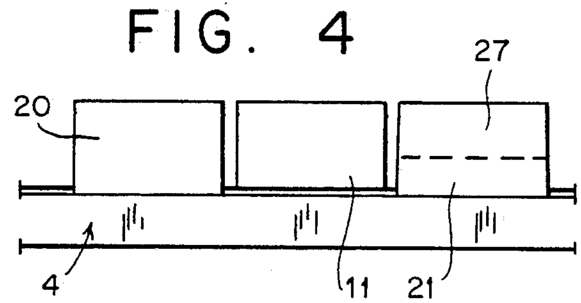
FIG. 4 a second exemplified embodiment of the locking device for the transport of containers.

FIG. 4 shows a second practical embodiment of a locking device for the transport of containers in which the arresting element consists of adjacent cams 20 and 21 between which the adjusting element 11 can be inserted, effecting a form-fitting connection, by lowering the container onto the loading surface 4 from above.

Figure 5:
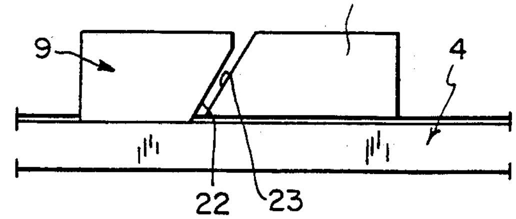
FIG. 5 a third embodiment.

FIG. 5 shows a third practical embodiment in which the arresting element 9 exhibits an undercut 22 and the adjusting element 11 has a projection 23 which engages the undercut 22. The arresting element and adjusting element are shown in a position corresponding to the in-transit position assumed by the container. By virtue of the undercut and projection, a form-fitting connection between the arresting element 9 and adjusting element 11 is assured, which connection also protects an in-transit container against tilting forces.

It is also possible to configure a container, as shown in FIG. 3, with an in-transit locking device in its lower, front section, in which configuration the bolting down device 12 shown in FIG. 1 and FIG. 2 can be replaced by an in-transit locking device as shown in FIG. 5.

Figure 6:
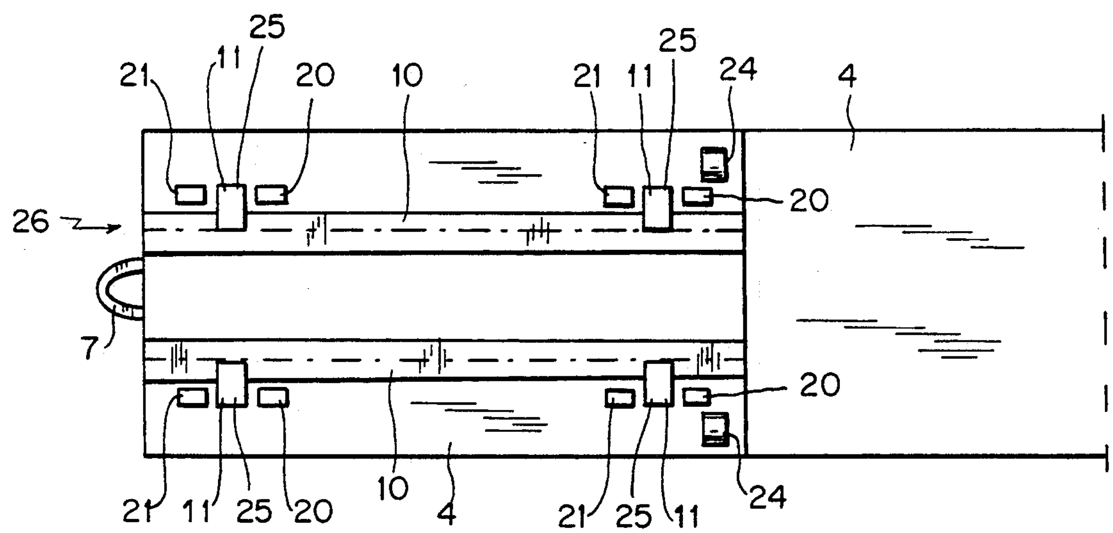
FIG. 6 a schematic top view of the loading surface of a vehicle with a container loaded thereon, of which only the component parts associated with the locking device are represented.

FIG. 6 shows a top view of a loading surface 4 of a vehicle with a container loaded thereon, which container is indicated here by its ground guides 10 and metal fitting 7. Roller elements, located on the container in the area of the rear front end and with which lift-on lift-off containers known in the art are equipped, are identified by Reference No. 24.

This embodiment provides for a container in-transit locking device of the kind shown in FIG. 4. Four arresting elements, which consist of adjacent cams 20 and 21, respectively, are positioned on the loading surface. The ground guides 10, which are configured as parallel double-T-section extending toward each other, display four adjusting elements 11. Each adjusting element 11 is a projecting flap laterally attached to a ground guide 10.

Figure 7:
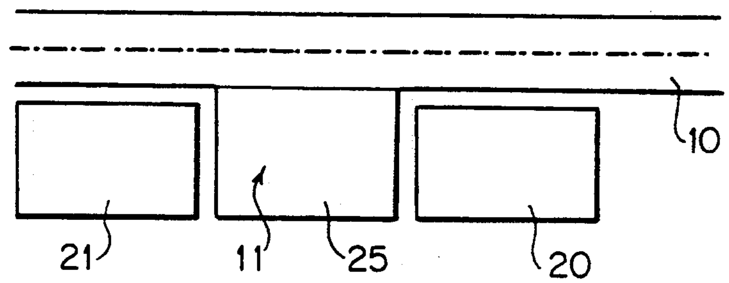
FIG. 7 a detailed view of a locking device for the transport of containers in a top view according to FIG. 6.

FIG. 7 shows a detailed view of an in-transit container locking device as per FIG. 6 in the top view, where the ground guide 10 is again identified by Reference No. 10. The upper flange of the ground guide 10 is visible in FIG. 7. The web of the ground guide is indicated by the dash-dotted line. Both the cams 20 and 21 of the arresting element are elementary blocks. It is clear from the drawing how the adjusting element 11 configured as a flap 25 solidly engages between both cams 20 and 21.

Figure 8:
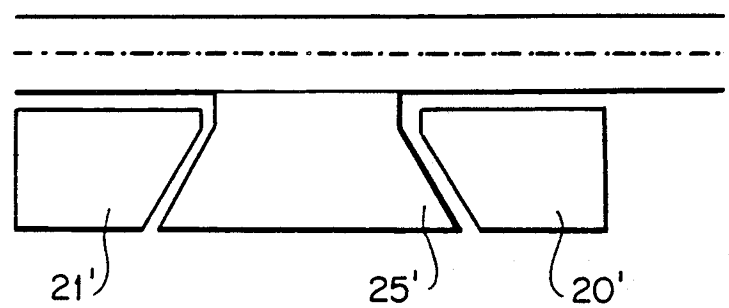
FIG. 8 an additional embodiment of a locking device for the transport of containers in a view according to FIG. 7.

FIG. 8 shows another practical embodiment in the top view, per FIG. 7.

Figure 9:
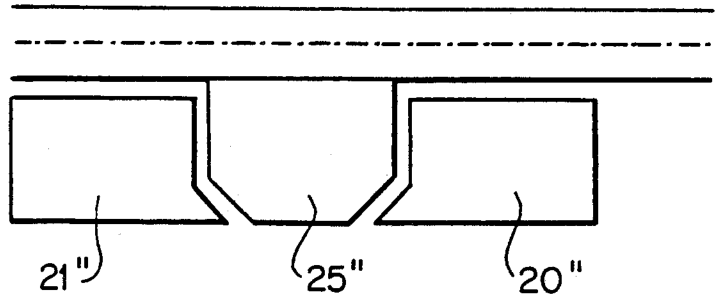
FIG. 9 another embodiment of a locking device for the transport of containers in a view according to FIG. 7, and FIG. 10 a view of a vehicle with a container loaded onto the loading surface according to FIG. 6, seen from the left front end of the vehicle.
Figure 11:
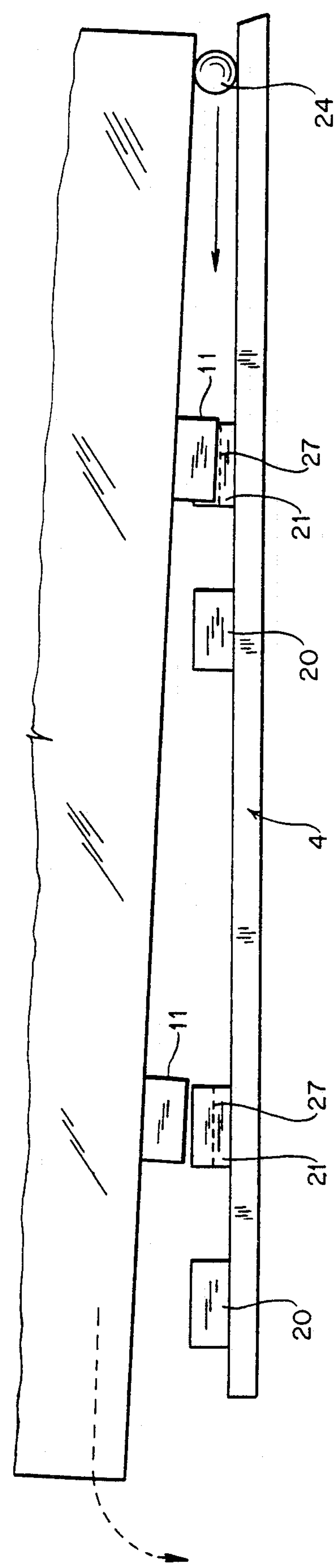
FIG. 11 shows movement of a container onto the back of a transport vehicle.

Cams 20' and 21' as well as the flap 25' have, here, been provided with undercuts, enabling a form-fitting connection in the in-transit position. In this embodiment, the flap exhibits an approximately swallow-tail shape. FIG. 9 shows an additional embodiment of the reciprocally solid connection of the cams 21'' and 20'' to the flap 25''.

Two adjoining cams, in between which a flap meshes, secure the container in an optimum fashion against braking and accelerating forces as well as against transverse forces during curves.

During movement of the container on the loading surface to effect on-loading or off-loading by means of a lift-on lift-off mechanism, the initially protruding cams of the arresting elements can pose an obstruction in the path of movement of the container to be moved into its in-transit position. In order to prevent the cam surfaces facing the direction of the sliding movement from obstructing further movement, provision has been made for the first cam 21 of each arresting element 9 facing the front end of a vehicle loading surface 4 to be flatter than the respective adjacent second cam 20 of same arresting element working in conjunction with it. In FIG. 1 and FIG. 6, the front end of a loading surface is indicated by the arrow 26. In FIG. 4, the dashed line 27 on the left cam 21 indicates that the cam 21 can be approximately half as high.

Figure 10:
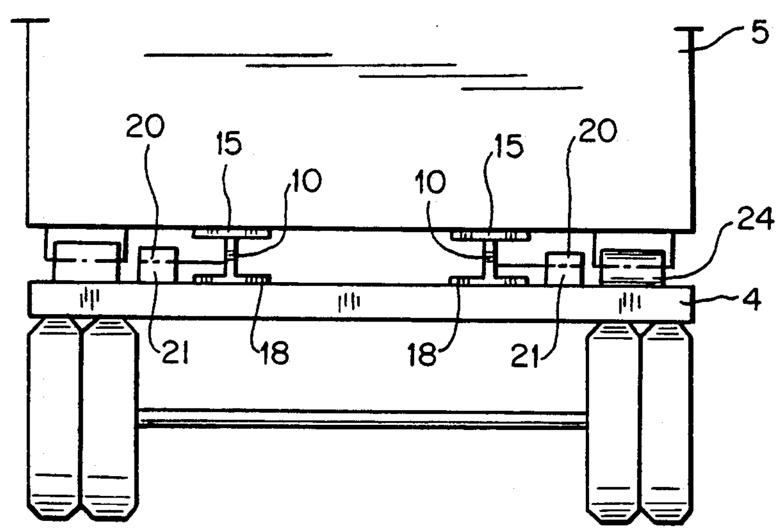

FIG. 10 shows a view pursuant to FIG. 6 in the direction of the arrow 26, as seen from the left. Identical part components are designated by identical reference numbers. From FIG. 10 it can be seen how the flap 25 has been mounted on the ground guides 10 and how the cams 21 and 20 are fixed on the loading surface 4. The container 5 has assumed its in-transit position and is secured against further movement by the flap 25, which meshes between both cams. In this embodiment of the in-transit container device, the container 5 can still be lifted perpendicularly up from the loading surface 4, for example, by means of a lifting device. The transloading of the container 5 using a lift-on lift-off mechanism is, of course, possible and is accomplished by initially lifting the container 5 up so far by means of the lift-on lift-off mechanism so that the flap 25 is raised above the somewhat flatter cam 21, which action, at the same time, results in the lift-on lift-off container's moving along the loading surface 4.

I claim:

1. A locking device for a lift-on lift-off container which has an underside and which is loadable onto the back of a transport vehicle having a loading surface providing an in transit position of the container, with a front end comprising:

an adjusting element having a length and arranged on the underside of the container at the level of said vehicle loading surface;

an arresting element arranged on said vehicle loading surface and associated with said adjusting element;

and said arresting element positioned adjacent to its associated adjusting element so that the container is maintained in the in transit position of the container;

each arresting element comprising two adjoining cams; the distance between the two adjoining cams being substantially equal to the length of said adjusting element;

each adjusting element has a projecting part which can be disposed between the cams; and a first cam of the arresting element, respectively, facing said front end of said vehicle loading surface, is flatter than a respective adjoining second cam of the same arresting element;

whereby said container is protected against longitudinal and transverse forces during the transit thereof, but the on-loading and off-loading vertical movement is not obstructed during the transit thereof.

2. The locking device for a container according to claim 1, wherein said adjusting element and said arresting element are configured as reciprocally intermeshable form-fitting elements.

3. The locking device for a container according to claim 2, wherein said arresting element has at least one undercut and wherein said adjusting element has at least one projection which engages said undercut.

4. The locking device for a container according to claim 2, wherein said form-fitting elements comprise a swallow-tail shaped form-fitting connection.

5. The locking device for a container according to claim 2, wherein said form-fitting elements comprise a wedge-shaped form-fitting connection.

6. The locking device for a container according to claim 1, further comprising a ground guide on said container underside; and wherein each adjusting element has a projecting flap laterally mounted on said ground guide in parallel alignment with said underside of the container.

7. The locking device for a container according to claim 1, wherein each cam comprises a block mounted on said loading surface.

8. The locking device for a container according to claim 1, wherein four adjusting elements and four arresting elements each have been provided for every container.

9. The locking device for a container according to claim 1, wherein each container has been provided with two securing adjusting elements and two arresting elements in the area of the front end and that the front end can also be secured by an actuable bolting down device.

10. The locking device for a container according to claim 9, wherein each bolting down device comprises a clamping jaw.

* * * * *

UNITED STATES PATENT AND TRADEMARK OFFICE

CERTIFICATE OF CORRECTION

PATENT NO. : 4,992,014

DATED : February 12, 1991

INVENTOR(S) : Normann Bock

It is certified that error appears in the above-identified patent and that said Letters Patent is hereby corrected as shown below:

On the title page:

"73 Assignee: Ldelhoff M.S.T.S. GmbH, Iserlohn, Fed. Rep. of Germany" should be -- 73 Assignee: Edelhoff M.S.T.S. GmbH, Iserlohn, Fed. Rep. of Germany --

In the abstract:

Line 4: "beloaded" should be -- be loaded --
Line 6: "contain" should be -- container --

Signed and Sealed this

Twenty-fourth Day of November, 1992

*Attest:*

DOUGLAS B. COMER

*Attesting Officer*

*Acting Commissioner of Patents and Trademarks*